No. 744,643. PATENTED NOV. 17, 1903.
J. SWAN.
STEAM ENGINE PISTON.
APPLICATION FILED APR. 24, 1903.
NO MODEL.
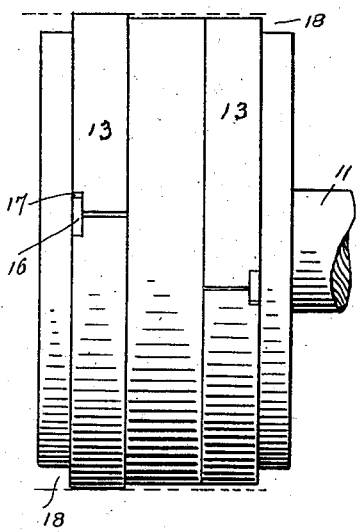
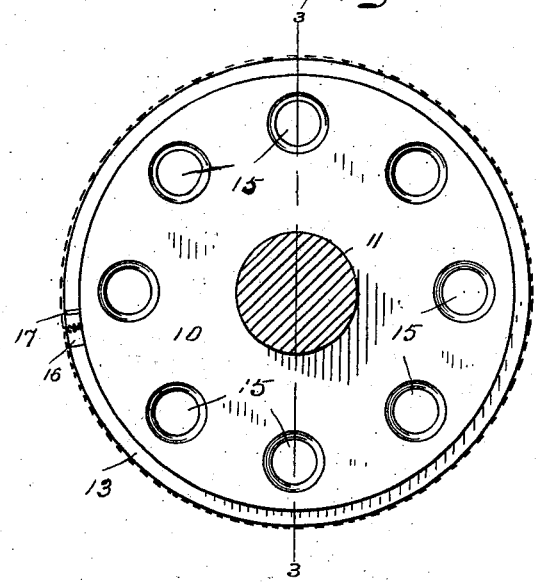
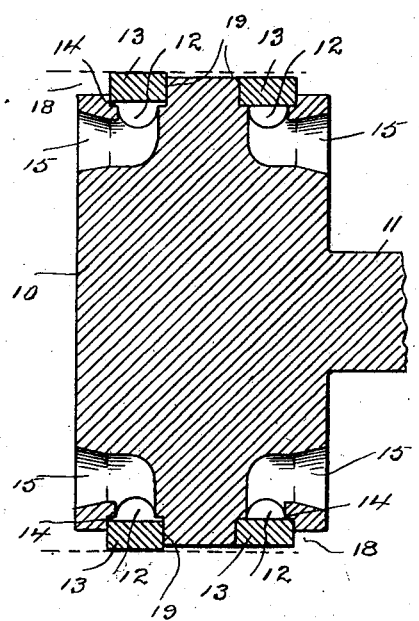
WITNESSES.
H. A. Lamb.
S. W. Atherton.
INVENTOR.
James Swan,
By A. M. Wooster
Atty.

No. 744,643. Patented November 17, 1903.

UNITED STATES PATENT OFFICE.

JAMES SWAN, OF SEYMOUR, CONNECTICUT.

STEAM-ENGINE PISTON.

SPECIFICATION forming part of Letters Patent No. 744,643, dated November 17, 1903.

Application filed April 24, 1903. Serial No. 154,049. (No model.)

*To all whom it may concern:*

Be it known that I, JAMES SWAN, a citizen of the United States, residing at Seymour, county of New Haven, State of Connecticut, have invented a new and useful Steam-Engine Piston, of which the following is a specification.

In reciprocating steam-engines as ordinarily constructed the entire peripheral surface of the piston is intended to engage the wall of the cylinder during the entire stroke in each direction.

It is one of the objects of this invention to produce a steam-engine piston which shall be adapted to all kinds of cylinders, old or new and whether the surface is even or uneven, and which shall fit the cylinder tightly, but with as little friction as possible.

It is a further object of the invention to produce a steam-engine piston in which a portion of the peripheral surface shall be expanded by the steam, so as to engage the wall of the cylinder closely when the piston is moving in either direction.

It is a further object of the invention to produce a steam-engine piston the exhaust end of which—*i. e.*, the portion of whose peripheral surface is forward when moving in either direction—shall automatically contract, so as to move freely in the cylinder and without friction, and the receiving end of which—*i. e.*, the rear portion—shall engage the wall of the cylinder closely, and thereby prevent leakage of steam.

With these and other objects in view the invention consists in certain constructions and in certain parts, improvements, and combinations, which will be hereinafter described and then specifically pointed out in the claims hereunto appended.

In the accompanying drawings, forming part of this specification, Figure 1 is a side elevation of my novel piston; Fig. 2, an end elevation thereof, the piston-rod being in section; and Fig. 3 is a section on the line 3 3 in Fig. 2.

10 denotes the body of the piston, 11 the piston-rod, and 12 circumferential grooves in the periphery of the body, which receive contractile rings 13. These grooves are shown as provided with shoulders 14, upon which the rings rest in their normal—that is, their contracted—position, as at the right in Fig. 3. Each end of the piston is provided with a plurality of openings 15, which lead into the grooves, as is clearly shown in Fig. 3.

The operation is as follows: In Fig. 3 I have indicated the wall of the cylinder by broken lines at top and bottom, but have for the sake of clearness exaggerated the distance between the periphery of the body of the piston and the wall of the cylinder. In this figure the piston is moving toward the right, and the steam entering the openings at the left of the piston passes into the left groove and acting upon the inner periphery of the left ring expands said ring outward, as clearly shown in Fig. 3, causing it to engage the wall of the cylinder closely. The action of the steam upon the rings is of course the same whether the steam is working under boiler-pressure or expansively. During this movement of the piston toward the right the right ring of course remains in its normal or contracted position and out of frictional engagement with the cylinder, as shown in Fig. 3, as the cylinder is exhausting on that side of the piston. As soon as the stroke toward the right is finished and the exhaust commences the pressure upon the inner periphery of the left ring is relieved, and said ring instantly contracts to its normal position out of contact with the cylinder, the normal position of a contracted ring being shown at the right in Fig. 3. As soon as steam enters the cylinder at the right end of the cylinder it passes into the openings in the right end of the piston and into the right groove, and acting upon the inner periphery of the right ring expands said ring outward and causes it to engage the wall of the cylinder closely, the position of an expanded ring being shown at the left in Fig. 3. It will thus be seen that the rings act alternately and the action is the same when the piston is moving in either direction, the outer periphery of one ring only being in close contact with the wall of the cylinder, the body of the piston and the contracted ring moving within the cylinder freely, and, furthermore, that as the operative ring is expanded by internal pressure the outer periphery thereof will within reasonable limits conform to irregularities in the wall of the cylinder, so that my novel piston when applied to an old and worn cylinder will prove very effective in preventing leakage of steam and will greatly increase the efficiency of the engine while reducing the cost of running it.

It will be noted that the diameter of the body is reduced at each end, so as to leave a space between the body and the wall of the cylinder. These spaces I have indicated by 18, and they are provided in order to permit steam on the receiving side of the piston to press upon the outer face of the ring and force the ring forward against the wall of the body, as at 19, at the right in Fig. 3, so as to prevent leakage of steam between the wall of the body and the inner face of the ring. In order to prevent leakage of steam at the joints in the rings, I provide plates 16 at the joints, one end of each plate being recessed into the end of the ring and rigidly secured thereto, and the other end of the plate being free and lapping past the joint and lying in a recess 17 at the other end of the ring.

Having thus described my invention, I claim—

1. A piston for steam-engines consisting of a body having a circumferential groove and shoulder at the sides of the groove, a contractile ring lying in said groove and normally resting on said shoulders with a space under the ring, and openings in the end of the body leading into the said space so that when steam is admitted behind the piston the ring will be expanded thereby and caused to engage the wall of the cylinder.

2. A piston for steam-engines consisting of a body having at opposite ends circumferential grooves, contractile rings lying in said grooves, spaces being formed under the rings, and openings in each end of the body leading into said spaces, the ring at the exhaust end of the piston remaining contracted and the ring at the receiving end of the piston being expanded against the wall of the cylinder by the pressure of steam upon its inner periphery during the movement of the piston in either direction.

3. A piston for steam-engines consisting of a body adapted to move freely within a cylinder and provided at each end with a circumferential groove and openings leading into said grooves and contractile rings in said grooves which normally move freely within the cylinder, steam-spaces being formed under the rings, the ring at the receiving end of the piston being expanded by pressure of steam on its inner periphery, whereby its outer periphery is caused to engage the cylinder closely.

4. A piston for steam-engines consisting of a body having at opposite ends circumferential grooves and openings leading into said grooves, contractile rings lying in said grooves with steam-spaces under them, and plates at the joints of the rings, one end of each plate being recessed into one end of the ring and rigidly secured thereto and the other end of the ring being provided with a recess to receive the free end of the plate, whereby leakage of steam at the joints of the rings is prevented.

5. A piston for steam-engines consisting of a body having circumferential grooves and shoulders therein and openings leading into said grooves below the shoulders, contractile rings lying in said grooves and normally engaging the shoulders, said rings being expanded outward alternately and caused to engage the cylinder closely by pressure of steam on their inner peripheries.

6. A piston for steam-engines consisting of a body having at opposite ends circumferential grooves, the diameter of the body being reduced outside of the grooves so as to leave spaces between the ends of the body and the wall of the cylinder, contractile rings lying in the grooves, spaces being formed under the rings, and openings in each end of the body leading into said spaces, the ring at the receiving end of the piston being expanded by pressure of steam on its inner periphery against the wall of the cylinder and the inner face of the ring being pressed against the wall of the body by pressure of steam against the outer face of the ring, so that leakage of steam is prevented.

In testimony whereof I affix my signature in presence of two witnesses.

JAMES SWAN.

Witnesses:
A. M. WOOSTER,
S. W. ATHERTON.